United States Patent
Mussmann et al.

(10) Patent No.: US 7,238,639 B2
(45) Date of Patent: Jul. 3, 2007

(54) OXYGEN STORAGE MATERIAL BASED ON CERIUM OXIDE, A PROCESS FOR ITS PREPARATION AND ITS USE

(75) Inventors: Lothar Mussmann, Offenbach (DE); Dieter Lindner, Hanau (DE); Martin Votsmeier, Maintal (DE); Egbert Lox, Hanau (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 09/931,162

(22) Filed: Aug. 17, 2001

(65) Prior Publication Data

US 2002/0042342 A1 Apr. 11, 2002

(30) Foreign Application Priority Data

Aug. 19, 2000 (EP) .................................. 00117898

(51) Int. Cl.
*B01J 23/00* (2006.01)
(52) U.S. Cl. ....................................... 502/304; 502/349
(58) Field of Classification Search ............. 423/213.2, 423/213.5; 502/304, 349
See application file for complete search history.

(56) References Cited

U.S. PATENT DOCUMENTS 5,529,969 A 6/1996 Bonneau et al.
6,133,194 A * 10/2000 Cuif et al. .................. 502/506
6,475,452 B1 * 11/2002 Hedouin et al. ......... 423/213.2

FOREIGN PATENT DOCUMENTS

| EP | 0 605 274 | 7/1994 |
|----|-----------|--------|
| EP | 0 715 879 | 6/1996 |
| EP | 0 778 071 | 6/1997 |
| EP | 0778071 A1 * | 6/1997 |
| EP | 0 870 531 | 3/1998 |
| EP | 0 870 543 | 3/1998 |
| EP | 0 842 900 | 5/1998 |
| EP | 0 993 860 | 9/1999 |
| EP | 1 040 870 | 10/2000 |
| JP | 58114730 | 7/1983 |
| WO | WO 99/26715 * | 6/1999 |
| WO | WO 00/27527 | 5/2000 |

* cited by examiner

*Primary Examiner*—Stanley S. Silverman
*Assistant Examiner*—Jonas N. Strickland
(74) *Attorney, Agent, or Firm*—Kalow & Springut LLP

(57) ABSTRACT

An oxygen storage material based on cerium oxide with at least one other oxide of the metals silicon and zirconium, wherein the cerium oxide and the other oxides are present in the form of a mixed oxide. The material is obtainable in that hydroxidic precursors of the mixed oxide are first prepared in a manner known per se using a wet-chemical route, these precursors are optionally dried at temperatures between 80 and 300° C. and the dried precursors are then treated under a hydrogen-containing atmosphere at a temperature between 600 and 900° C. for a period of 1 to 10 hours. The reductive thermal treatment endows the material with a greatly improved dynamic behavior as compared with conventional calcination in air.

7 Claims, 2 Drawing Sheets

OXYGEN STORAGE MATERIAL BASED ON CERIUM OXIDE, A PROCESS FOR ITS PREPARATION AND ITS USE

INTRODUCTION AND BACKGROUND

The present invention provides an oxygen storage material containing cerium oxide as well as a process for its preparation and its use for the catalytic conversion of substances, in particular for the treatment of exhaust gases from internal combustion engines.

Internal combustion engines emit as primary pollutants, with the exhaust gases, carbon monoxide CO, unburnt hydrocarbons HC and nitrogen oxides NOx, a high percentage of which are converted by modem exhaust gas treatment catalysts into the harmless components water, carbon dioxide and nitrogen. Conversion takes place substantially under stoichiometric conditions, that is to say the oxygen present in the exhaust gas is controlled with the aid of a so-called lambda probe in such a way that the oxidation of carbon monoxide and hydrocarbons and the reduction of nitrogen oxides to nitrogen can take place almost quantitatively. The catalysts developed for this purpose are called three-way catalysts. They usually contain, as catalytically active components, one or more metals from the platinum group in the Periodic Table of Elements on high surface area support materials such as γ-aluminum oxide with specific surface areas of more than 50 m$^2$/g.

Stoichiometric conditions are present when the air/fuel ratio λ is 1. The air/fuel ratio λ is the air/fuel ratio normalized to stoichiometric conditions. The air/fuel ratio states how many kilograms of air are required for complete combustion of one kilogram of fuel. In the case of conventional gasoline engine fuels, the stoichiometric air/fuel ratio has a value of 14.6. Substoichiometric exhaust gas compositions with λ<1 are called rich and superstoichiometric compositions with λ>1 are called lean.

The engine exhaust gas, depending on the load and the speed of revolution of the engine, experiences relatively large periodic variations in air/fuel ratio around the value 1. For better conversion of oxidizable pollutant components under these dynamic conditions, oxygen storage components such as, for example, cerium oxide, are used which bind oxygen by changing the oxidation state from $Ce^{3+}$ to $Ce^{4+}$ when it is present in excess and release it again for the oxidative reaction by changing from $Ce^{4+}$ to $Ce^{3+}$ when there is a insufficiency of oxygen in the exhaust gas.

Car exhaust gas catalysts are subjected to exhaust gas temperatures of up to 1100° C. These high temperatures require the use of appropriate materials for the catalysts which are thermally resistant and have long-term stability.

EP 0 207 857 B1 describes a material based on cerium oxide which contains as essential components cerium oxide and an additive consisting of at least one of the oxides of the metals A from the group aluminum, silicon, zirconium and thorium. The material, with a specific surface area of more than 10 m$^2$/g, is stable up to a firing temperature of 900° C.

EP 0 444 470 A1 describes a high surface area cerium oxide which consists of an intimate mixture of cerium oxide with 5 to 25 mol %, with respect to moles of cerium oxide, of a cerium oxide stabilizer. Lanthanum, neodymium and yttrium are mentioned as stabilizers. The material is obtained by co-precipitation from a common solution of a cerium oxide precursor and a precursor of the cerium oxide stabilizer and subsequent calcination in air at temperatures above 500° C. The BET surface area of this material after calcination at 980° C. for a period of 4 hours is still more than 20 m$^2$/g.

EP 0 337 809 A2 describes a catalyst composition which contains, inter alia, zirconium oxide particles stabilized with cerium oxide. The zirconium oxide particles are stabilized with cerium oxide by impregnating zirconium oxide with a cerium salt solution. The impregnated particles obtained therefrom are dried and calcined until the graphical representation of the X-ray diffraction spectrum no longer shows a peak for the crystalline form of cerium oxide. Cerium oxide is present in the cerium oxide/zirconium oxide mixture in an amount of 10 to 50 wt. %, with respect to the zirconium oxide. In addition to the cerium salt, an yttrium and/or calcium salt may also be used. The X-ray diffraction spectrum, after the material has been calcined for 10 hours in air at a temperature of 900° C., shows only a peak for tetragonal zirconium oxide and no peak for cerium oxide. Cerium oxide is thus present in this material substantially in the form of a solid solution with the zirconium oxide.

EP 0 827 775 A1 describes an oxygen storage mixed oxide. The mixed oxide consists of cerium oxide or a cerium/zirconium mixed oxide which is loaded with praseodymium oxide. The molar ratio of praseodymium to cerium in the mixed oxide is between 1:4 and 4:1.

WO 98/42437 describes a catalyst composition which contains a mixed oxide of cerium and praseodymium and optionally one or more other rare earth oxides. The atomic ratio Pr:Ce is in the range between 2:100 and 100:100. The mixed oxide may be obtained by co-precipitation or by impregnating cerium oxide particles with a praseodymium precursor compound and then calcining in air and has, compared with pure cerium oxide, an improved oxygen storage capacity.

WO 98/45027 describes another catalyst composition which contains an oxygen storage material with improved oxygen storage capacity. The oxygen storage material is a mixed oxide which contains oxides of cerium, neodymium and zirconium. The material can be obtained by co-precipitation of compounds of zirconium and the rare earth metals followed by calcination in air.

The known oxygen storage materials are used in three-way catalysts for the treatment of exhaust gases from stoichiometrically operated internal combustion engines. An essential criterion for assessing these materials is thus their ability to improve the conversion of carbon monoxide and nitrogen oxides under the dynamic conditions prevailing in the exhaust gas. One measure of the dynamic conversion is the point of intersection of the conversion curves for carbon monoxide and nitrogen oxides, the so called "cross-over" point for exhaust gas compositions varying periodically between rich and lean. The conversion measured at the cross-over point is the highest conversion which can simultaneously be obtained for carbon monoxide and nitrogen oxides and is a measure of the rate at which it is possible to change the oxygen storage material being used from one oxidation state to the other. This property of the storage material is called the dynamics in the following. The higher the conversion at the cross-over point, the better also is the dynamic behaviour of the catalyst under consideration.

An object of the present invention is to provide an oxygen storage material which has better dynamic behaviour than the materials described hitherto. Further objects of this invention are a process for preparing this material and the use of this material in exhaust gas treatment catalysts for internal combustion engines.

SUMMARY OF THE INVENTION

The above and other objects of the present invention can be achieved by an oxygen storage material based on cerium oxide with at least one other oxide of the metals silicon and zirconium, wherein the cerium oxide and the other oxides are present in the form of a mixed oxide. The material can be obtained by first preparing a hydroxidic precursor of the mixed oxide in a manner known per se using a wet-chemical route, optionally drying this precursor at temperatures between 80 and 300° C. and then treating the dried precursor under a hydrogen-containing atmosphere at a temperature between 600 and 900° C. for a period of 1 to 10 hours.

In the context of this application, a mixed oxide is understood to be a material consisting of at least two oxides which are present in an intimate mixture on the molecular scale and which exhibits a single-phase crystal structure.

The material according to the invention differs from known mixed oxides based on cerium oxide due to the greatly improved mobility of the oxygen in the crystal lattice and the better dynamics associated therewith during the redox process taking place between the oxidizing and reducing components in a stoichiometrically composed exhaust gas.

To prepare the material, hydroxidic precursors of the mixed oxide are first formed in a wet-chemical process known per se. A suitable wet-chemical process for this purpose is, for example, co-thermohydrolysis of aqueous solutions of the salts of cerium and zirconium and/or silicon. Thus, aqueous solutions of cerium nitrate and zirconyl nitrate can be hydrolyzed in autoclaves by raising the temperature. Another wet-chemical process for preparing hydroxidic precursors is so-called co-precipitation. Here, salts of cerium and zirconium and/or silicon in an aqueous solution are precipitated in the form of hydroxides by adding a base. Further suitable processes are described, for example, in EP 0 207 857 B1 and in EP 0 444 470 A1.

The hydroxidic precursors are separated from the reaction medium and can then be dried at temperatures between 80 and 300° C. This treatment leads to a partly amorphous oxide/hydroxide/carbonate mixture which has a loss on ignition, due to the hydroxide and carbonate content, of at least 2 wt. %. Drying is preferably performed in such a way that the loss on ignition is at least 4, in particular at least 6 wt. %. The maximum loss on ignition of this oxide/hydroxide/carbonate mixture does not usually exceed 20 wt. %. The specific surface area (BET surface area measured according to DIN 66132) is at least 80, generally more than 140 and frequently even more than 200 m$^2$/g.

To convert these precursors into the material according to the invention, they are subjected to thermal treatment under reducing conditions such as, for example, thermal treatment at 600 to 900° C. for a period of 1 to 10 hours under forming gas (95 vol. % nitrogen+5 vol. % hydrogen). Surprisingly, it has been shown that this thermal treatment endows the oxygen storage material with better dynamic behaviour than calcination under oxidizing conditions, as is disclosed in the prior art.

As a result of thermal treatment under reducing conditions, the specific surface area of the material is also reduced. The duration and temperature of thermal treatment should thus be managed in such a way that the specific surface area of the final material is not less than 20, preferably not less than 40 m$^2$/g.

According to current understanding of the invention, the improved dynamics of the material according to the invention are due to the thermal treatment with hydrogen facilitating restructuring and modified orientation of the components of the mixed oxide in the crystal lattice. The structure of the mixed oxide according to the invention has, as compared to the structure obtainable by calcination in air, increased long-distance order in the primary crystallites which increases the mobility of oxygen in the crystal lattice and thus increases the rate of the redox cycle.

The material according to the invention preferably contains 20 to 99 wt. % cerium oxide, with respect to the total weight of material. The material particularly preferably contains 60 to 90 wt. % cerium oxide and 40 to 10 wt. % zirconium oxide.

Instead of preparing the oxide/hydroxide/carbonate mixture itself, a pre-made, purchased oxide/hydroxide/carbonate mixture can be converted subsequently into the material according to the invention by the reductive thermal treatment mentioned above. In this case, temperatures between 600 and 900° C. are also applied for a period of 1 to 10 hours. It is important that the purchased material also has a loss on ignition of at least 2 wt. % and a specific surface area of more than 80 m$^2$/g. A loss on ignition of more than 2 wt. % in combination with a corresponding, high, specific surface area is a sign that the material has not previously been subjected to too intense calcination in air and therefore that its dynamic properties can still be improved by reductive thermal treatment. From experience, subsequent reductive thermal treatment of oxygen storage materials with a loss on ignition of less than 2 wt. % does not lead to an improvement in their dynamic properties.

The combination of loss on ignition and specific surface area for which sufficient improvement in the material properties can be produced by thermal treatment under reducing conditions depends on the material. For cerium/zirconium mixed oxides, it has been shown that this is the case with losses on ignition of more than 6 wt. % and specific surface areas of more than 140 m$^2$/g.

In a preferred embodiment of the material according to the invention, it also contains an additional 0.5 to 20 wt. % of at least one metal from the group yttrium, scandium, lanthanum, praseodymium, neodymium, samarium, gadolinium and terbium, calculated as oxide. These doping additives increase the thermal stability of the oxygen storage material and can also further improve the mobility of oxygen ions in the crystal lattice due to additional defect centres in the lattice.

BRIEF DESCRIPTION OF DRAWINGS

The present invention will be further understood with reference to the drawings, wherein.

DETAILED DESCRIPTION OF INVENTION

Figure 1:
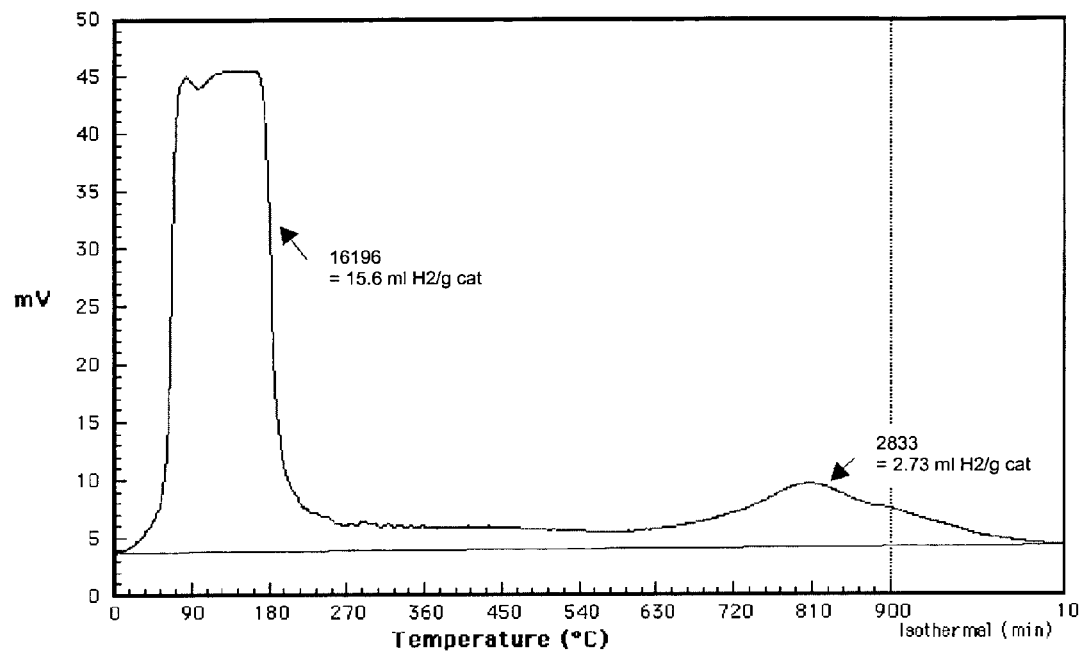
FIG. 1 is a graph showing the results of TPR measurements on a material according to the invention.

The invention is explained in more detail in the following examples. In the examples, conventional honeycomb carrier structures made of cordierite (cell density: 62 cm$^{-2}$) were coated with catalytically active coatings using different oxygen storage materials based on cerium/zirconium mixed oxides and their catalytic activity was tested.

To make the catalysts, the commercially available raw materials specified below were used. Inter alia, three grades of a cerium/zirconium mixed oxide, each with a zirconium oxide content of about 30 wt. %, with respect to the total weight of mixed oxide, were used. The cerium/zirconium mixed oxide called $CeO_2/ZrO_2$ I is a co-precipitated material which had been calcined in air to only a small extent during production and thus had a relatively high specific surface area of 220 m$^2$/g. The loss on ignition was 10.1 wt. %. $CeO_2/ZrO_2$ II and $CeO_2/ZrO_2$ III were also co-precipitated mixed oxides, but these had already been subjected to intense calcination in air during production and thus had specific surface areas of only 121 and 77 m$^2$/g respectively.

| | |
|---|---|
| La/Al$_2$O$_3$: | γ-aluminum oxide, stabilized with 3 wt. % lanthanum, calculated as lanthanum oxide; BET surface area in the condition as supplied: 140 m$^2$/g; average particle size in condition as supplied: $d_{50} \approx 15$ μm; |
| (Al, Ce, Zr) oxide: | mixed oxide of aluminum oxide and 30 wt. % cerium oxide and 30 wt. % zirconium oxide, with respect to the total weight of mixed oxide; BET surface area in condition as supplied: 102 m$^2$/g; average particle size in condition as supplied: $d_{50} \approx 28$ μm; |
| γ-Al$_2$O$_3$: | pure gamma-aluminum oxide; BET surface area in condition as supplied: 140 m$^2$/g; average particle size in condition as supplied: $d_{50} \approx 15$ μm; |
| CeO$_2$ZrO$_2$ I: | co-precipitated cerium/zirconium mixed oxide with 70 wt. % cerium oxide BET surface area in condition as supplied: 220 m$^2$/g; loss on ignition: 10.1 wt. % average particle size in condition as supplied: $d_{50} \approx 10$ μm; |
| CeO$_2$/ZrO$_2$ II: | co-precipitated cerium/zirconium mixed oxide with 70 wt. % cerium oxide BET surface area in condition as supplied: 121 m$^2$/g; loss on ignition: 5.4 wt. % average particle size in condition as supplied: $d_{50} \approx 16$ μm; |
| CeO$_2$/ZrO$_2$ III: | co-precipitated cerium/zirconium mixed oxide with 70 wt. % cerium oxide BET surface area in condition as supplied: 77 m$^2$/g; loss on ignition: 3.5 wt. % average particle size in condition as supplied: $d_{50} \approx 16$ μm; |
| BaO: | barium oxide, technical grade |
| Pd(NO$_3$)$_2$: | palladium nitrate |
| Rh(NO$_3$)$_3$: | rhodium nitrate |
| Honeycomb structure: | cordierite; 62 cells/cm$^2$; volume: 0.618 l; dimensions: 101.6 mm Ø; 76.2 mm length |

Oxygen Storage Capacity:

In a preliminary trial, the oxygen storage capacity of the material according to the invention was compared with that of the conventional oxygen storage material $CeO_2/ZrO_2$ II. The material according to the invention was obtained by thermal treatment of $CeO_2/ZrO_2$ I at 900° C. for a period of 6 hours under forming gas. Both materials were impregnated with palladium nitrate by applying the pore volume impregnation method and then calcined in air for 2 hours at 500° C. The materials were saturated with oxygen due to calcination in air. The final materials contained 2 wt. % Pd, with respect to their total weight.

Figure 2:
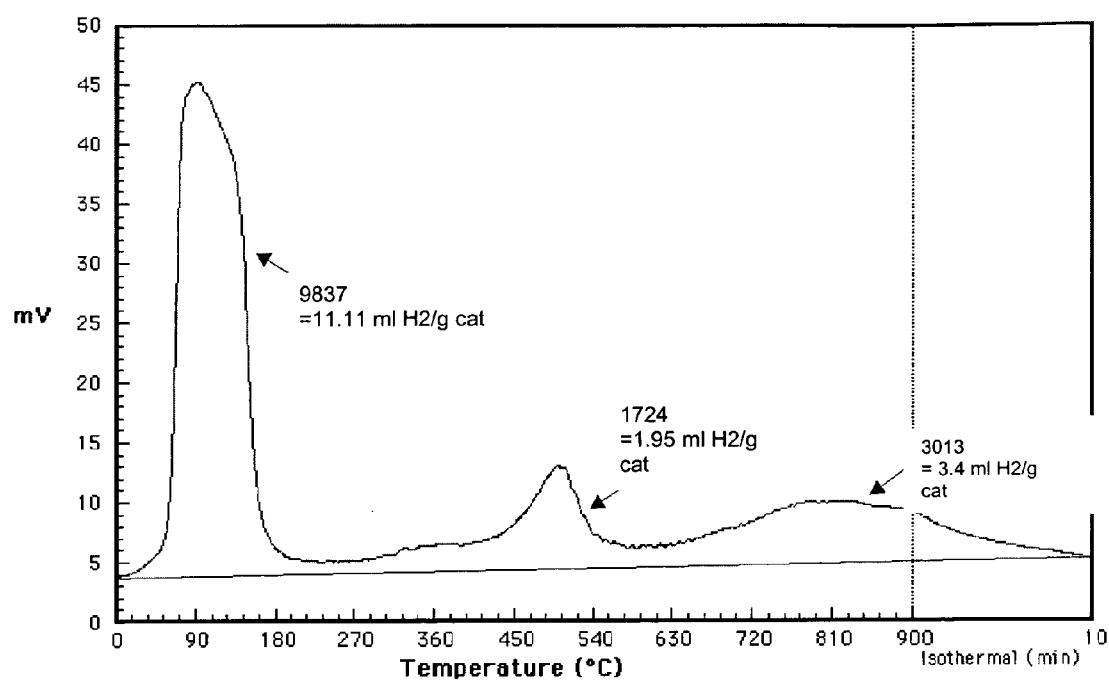
FIG. 2 is a graph showing the results of TPR measurements on a comparison material.

To determine the oxygen storage capacity, both samples of materials were subjected to a TPR measurement (Temperature Programmed Reduction). The TPR spectrum was recorded in an argon/hydrogen atmosphere (5 vol. % hydrogen). The material samples were heated from room temperature to 900° C., at a rate of 20° C./min, and the hydrogen consumption occurring due to reaction with the stored oxygen was measured. The results of these measurements are shown graphically in FIG. 1 for the material according to the invention and in FIG. 2 for the comparison material.

In the temperature range between room temperature and 270° C. the material according to the invention showed a hydrogen consumption of 15.6 ml H$_2$/g catalyst, whereas the conventional $CeO_2/ZrO_2$ II had a hydrogen consumption of only 11.1 ml H$_2$/g catalyst. The total hydrogen consumption up to a temperature of 900° C. was 15.5 ml H$_2$/g catalyst for the conventional material and 18.3 ml H$_2$/g catalyst for the material according to the invention.

These measurements show that the material according to the invention has 40% greater availability of stored oxygen, even at low temperatures. In addition it has approximately 20% greater oxygen storage capacity over the entire temperature range from room temperature to 900° C.

COMPARISON EXAMPLE 1

An aqueous coating solution was made up which contained La/Al$_2$O$_3$, $CeO_2/ZrO_2$ I and BaO in the ratio by amounts of 6:6:1. The solids content of the suspension was 45 wt. %. The suspension was homogenized in a mill until the average particle size of the solids was about 2–3 μm.

A honeycomb structure was coated by immersion in this suspension. The coating was dried for 1 hour at 120° C. and then calcined in air for a period of 2 hours at 500° C. Then the coating was impregnated with a solution of palladium nitrate, and again dried and calcined. The final layer contained the following amounts of coating materials:

| | |
|---|---|
| La/Al$_2$O$_3$: | 60 g/l |
| CeO$_2$/ZrO$_2$ I (70/30): | 60 g/l |
| BaO: | 10 g/l |

+Pd: 2.12 g/l (corresponding to 60 g/ft$^3$)

The catalyst prepared in this way is called CC1 in the following.

COMPARISON EXAMPLE 2

Another catalyst was prepared in accordance with comparison example 1. Instead of $CeO_2/ZrO_2$ I, however, $CeO_2/ZrO_2$ II was used. The catalyst prepared in this way is called CC2 in the following.

COMPARISON EXAMPLE 3

Another catalyst was prepared in accordance with comparison example 1. Instead of $CeO_2/ZrO_2$ I, however, $CeO_2/ZrO_2$ III was used. The catalyst prepared in this way is called CC3 in the following.

EXAMPLE 1

Another catalyst was prepared in accordance with comparison example 1. However, the $CeO_2/ZrO_2$ I was subjected to a reducing treatment in forming gas at 900° C. for a period of 6 hours prior to its use. The catalyst prepared in this way is called C1 in the following.

APPLICATION EXAMPLE 1

All four catalysts were subjected to hydrothermal ageing at 985° C. in an atmosphere of 10 vol. % water, 10 vol. % oxygen, with the remainder nitrogen, for a period of 16 hours. Afterwards, core samples (25.4 mm Ø and 76.2 mm length) were taken from the catalysts and their rates of conversion were measured in a model gas unit at three different temperatures (350° C., 400° C. and 450° C.) of the model exhaust gas, a space velocity SV of 225,000 h$^{-1}$ and an air/fuel ratio of λ=0.99. During the measurements the air/fuel ratios were modulated with a frequency of 1 Hz and an amplitude of ±0.8 A/F.

The composition of the model gas is given in table 1 and the results of the measurements are listed in table 2.

TABLE 1

Composition of the model exhaust gas

| Gas component | Concentration | Gas component | Concentration |
|---|---|---|---|
| CO | 0.7 vol. % | NOx (NO) | 0.2 vol. % |
| $H_2$ | 0.23 vol. % | $CO_2$ | 13 vol. % |
| $O_2$ | 0.65 vol. % | $SO_2$ | 20 ppm |
| Propene | 666 ppm | $H_2O$ | 10 vol. % |
| Propane | 333 ppm | $N_2$ | remainder |

TABLE 2

Pollutant conversions for catalysts CC1, CC2, CC3 and C1 at a space velocity of 225,000 $h^{-1}$ and λ = 0.99; 1 Hz ± 0.8 A/F

| | T = 350° C. | | | T = 400° C. | | | T = 450° C. | | |
|---|---|---|---|---|---|---|---|---|---|
| Catalyst | CO [%] | HC [%] | $NO_x$ [%] | CO [%] | HC [%] | $NO_x$ [%] | CO [%] | HC [%] | $NO_x$ [%] |
| CC1 | 45.8 | 44.3 | 18.1 | 44.8 | 64.9 | 42.8 | 41.9 | 75.6 | 55.5 |
| CC2 | 49.8 | 49.8 | 24.8 | 45.7 | 68.1 | 48.0 | 42.0 | 77.9 | 60.8 |
| CC3 | 49.8 | 50.7 | 23.7 | 42.6 | 66.8 | 44.4 | 37.1 | 76.7 | 55.8 |
| C1 | 52.7 | 56.1 | 38.4 | 49.2 | 72.8 | 59.7 | 47.2 | 81.6 | 71.2 |

After completing these measurements at the particular temperature, the air/fuel ratio was increased from 0.99 to 1.01 over 5 minutes by raising the oxygen content. The cross-over points of the CO and NOx conversion curves were determined in this way. The values measured are listed in table 3.

TABLE 3

Cross-over points CO/NOx of the CO and NOx conversion curves for catalysts CC1, CC2, CC3 and C1 at SV = 225,000 $h^{-1}$ and with an air/fuel ratio modulation of 1 Hz ± 0.8 A/F

| Catalyst | T = 400° C. CO/NOx [%] | T = 450° C. CO/NOx [%] |
|---|---|---|
| CC1 | | 51.4 |
| CC2 | 47.2 | 54.9 |
| CC3 | 43.8 | 50.0 |
| C1 | 56.6 | 63.0 |

COMPARISON EXAMPLE 4

A two-layered catalyst was made up on a honeycomb structure using the materials specified above. The first layer of this catalyst lay directly on the honeycomb structure. The second layer was applied on top of the first and was in direct contact with the exhaust gas to be treated. The composition of the final catalyst is given below:

Composition of the first layer:

| (Al, Ce, Zr) oxide: | 120 g/l | |
|---|---|---|
| $CeO_2/ZrO_2$ I (70/30): | 24 g/l | + Pd: 1.908 g/l |
| BaO: | 17 g/l | |

To make up the first layer, the three oxidic materials were suspended in water and homogenised in a mill. Then palladium was deposited onto all three components in suspension by adding a solution of palladium nitrate and a honeycomb structure was coated by immersion in this suspension, followed by drying and calcination of the honeycomb structure.

Composition of the second layer:

| $La/Al_2O_3$: | 10 g/l | + Rh: 0.212 g/l |
|---|---|---|
| $CeO_2/ZrO_2$ I (70/30): | 20 g/l | |
| $Al_2O_3$: | 30 g/l | |

To make up the second layer, $La/Al_2O_3$ was first coated with rhodium by impregnating with rhodium nitrate. Then the catalyzed $La/Al_2O_3$, together with the other oxidic components, was processed to produce a coating suspension and the honeycomb structure was coated by immersion in this suspension. The coating was dried in the same way as described when making up the first layer and then calcined.

The catalyst prepared in this way is called CC4 in the following.

EXAMPLE 2

Another double-layered catalyst was prepared in accordance with comparison example 4. However, the $CeO_2/ZrO_2$ I was subjected to a reducing treatment in forming gas at 900° C. for a period of 6 hours prior to its use. The catalyst prepared in this way is called C2 in the following.

APPLICATION EXAMPLE 2

The two catalysts CC4 and C2 were subjected to a cyclic rich/lean rapid ageing for a period of 40 hours in the engine. The ageing cycle consisted of four phases. In the first phase, the engine is operated for a period of 20 seconds with a stoichiometric air/fuel mixture. Accordingly, the exhaust gas also has a stoichiometric composition ($\lambda_{exhaust\ gas}$=1.000). Then the engine is operated for a period of 16 seconds with a rich air/fuel mixture and the carbon monoxide concentration in the exhaust gas is raised from about 0.6 vol. % to 5 vol. % by appropriate adjustment of the engine management system. After the passage of 6 seconds of this rich phase, secondary air is added to the exhaust gas upstream of the catalyst in order to burn, on the catalyst, the carbon monoxide emitted by the engine. As a result of the exothermal heat being thus released, the bed temperature of the catalyst rises to 1050° C. After termination of the rich phase, the addition of secondary air is stopped and the engine is again operated for a period of 4 seconds with a stoichiometric air/fuel mixture. The ageing cycle lasts 40 seconds and is repeated constantly during the entire ageing period of 40 hours.

After completing this ageing process, the light-off behaviour and the maximum pollutant conversion by the catalysts were measured on the engine test bed. For this, the catalysts were subjected to a real exhaust gas, the temperature of which was raised from 100 to 500° C. at a rate of 15° C./min, at a space velocity of 50,000 $h^{-1}$. The exhaust gas had an air/fuel ratio λ=0.999, which was modulated with 1 Hz±0.5 A/F (A/F=air/fuel ratio). The results of these measurements are given in table 4.

TABLE 4

| | | | | | | | | | |
|---|---|---|---|---|---|---|---|---|---|
| Cata-lyst | CO $T_{50\%}$ [° C.] | HC $T_{50\%}$ [° C.] | NOx $T_{50\%}$ [° C.] | CO $T_{90\%}$ [° C.] | HC $T_{90\%}$ [° C.] | NOx $T_{90\%}$ [° C.] | $CO_{max}$ [%] | $HC_{max}$ [%] | $NOx_{max}$ [%] |
| CC4 | 384 | 373 | 381 | | 391 | 412 | 80 | 95 | 89 |
| C2 | 370 | 359 | 368 | 445 | 496 | 438 | 95 | 96 | 94 |

Light-off temperatures of the catalysts and maximum pollutant conversion

Columns 2 to 4 contain the light-off temperatures of the catalysts, that is the temperatures at which 50% of the particular pollutant is converted. Columns 5 to 7 contain the corresponding temperatures for 90% pollutant conversion. Columns 8 to 10 give the maximum degree of pollutant conversion measured. It can be seen that the catalyst prepared using the oxygen storage material according to the invention has substantially lower light-off temperatures and higher maximum rates of conversion than the comparison catalyst.

The cross-over points of the CO and NOx conversion curves were also measured for these catalysts at an exhaust gas temperature of 400° C. and a space velocity of 50,000 h⁻¹ on the engine test bed. The air/fuel ratio was modulated with a frequency of 1 Hz and an amplitude of ±0.5 A/F. The results are given in table 5.

TABLE 5

Cross-over points CO/NOx of CO and NOx conversion curves

| | Rich → lean | | lean → rich | |
|---|---|---|---|---|
| Catalyst | CO/NOx [%] | HC [%] | CO/NOx [%] | HC [%] |
| CC4 | 66 | 88 | 63 | 88 |
| C2 | 72 | 91 | 73 | 91 |

Table 5 contains the experimentally determined values for the cross-over points on changing from a rich to a lean exhaust gas and also for the change from a lean to a rich exhaust gas.

Further variations and modifications of the foregoing will be apparent to those skilled in the art and are intended to be encompassed by the claims appended hereto.

European priority application EP 00 117 898.7 is relied on and incorporated herein by reference.

What is claimed is:

1. A process for preparing an oxygen storage material for use in an automobile exhaust gas purification system, comprising preparing a hydroxidic precursor of a mixed oxide of cerium and at least one of silicon or zirconium by a wet-chemical process, drying said precursors at a temperature from 80° C. to 300° C. with the formation of an oxide/hydroxide/carbonate dried mixture, treating the dried mixture under a hydrogen-containing atmosphere at a temperature from 600° C. to 900° C. for a period of 1 to 10 hours.

2. The process according to claim 1 wherein said wet-chemical process is carried out by (a) co-thermohydrolysis of an aqueous solution of salts of cerium and at least one of zirconium or silicon (b) precipating hydroxides of cerium and at least one of zirconium or silicon from an aqueous solution of their respective salts by adding a base to said aqueous solution.

3. A process for improving the oxygen storage capacity and the dynamic behavior of oxygen storage materials comprising mixed oxides of cerium oxide and zirconium oxide, wherein said oxygen storage material has a loss on ignition of more than 6 wt.-% and a specific surface area of more than 140 m²/g and wherein the process comprises heating said oxygen storage material in a reducing atmosphere at temperatures between 600 and 900° C. for a period of 1 to 10 hours.

4. The process of claim 3, wherein said oxygen storage material contains 20 to 99 wt.-% of cerium oxide with respect to the total weight of said oxygen storage material.

5. The precess of claim 4, wherein said oxygen storage material contains 60 to 90 wt.-% of cerium oxide and 40 to 10 wt.-% of zirconium oxide with respect to its total weight.

6. The process of claim 4, wherein said oxygen storage material further comprises 0.6 to 20 wt.-% of a metal oxide, wherein the metal of the metal oxide is selected from the group consisting of yttrium, scandium, lanthanum, praseodymium, neodymium, samarium, gadolinium and terbium.

7. The process according to claim 3, wherein the oxygen storage material has a specific surface area of more than 20 m²/g after heating in said reducing atmosphere.

* * * * *